US012764503B2

(12) United States Patent
Ren et al.

(10) Patent No.: US 12,764,503 B2
(45) Date of Patent: Oct. 13, 2026

(54) MACHINE LEARNING GROUP SWITCHING

(71) Applicant: QUALCOMM Incorporated, San Diego, CA (US)

(72) Inventors: Yuwei Ren, Beijing (CN); Huilin Xu, Temecula, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 18/564,986

(22) PCT Filed: Aug. 4, 2021

(86) PCT No.: PCT/CN2021/110424
§ 371 (c)(1),
(2) Date: Nov. 28, 2023

(87) PCT Pub. No.: WO2023/010302
PCT Pub. Date: Feb. 9, 2023

(65) Prior Publication Data
US 2024/0267710 A1 Aug. 8, 2024

(51) Int. Cl.
*H04W 4/08* (2009.01)
*H04L 41/16* (2022.01)

(52) U.S. Cl.
CPC ............... *H04W 4/08* (2013.01); *H04L 41/16* (2013.01)

(58) Field of Classification Search
CPC ... G06F 18/285; G06N 20/00; H04L 41/0893; H04L 41/142; H04L 41/145; H04L 41/147; H04L 41/16; H04W 4/08; H04W 72/23
See application file for complete search history.

(56) References Cited

U.S. PATENT DOCUMENTS 11,109,283 B1 * 8/2021 Kulkarni ............... H04W 24/02
11,431,583 B2 * 8/2022 Ma ...................... H04L 41/0816
(Continued)

FOREIGN PATENT DOCUMENTS

BR 112021006648 A2 * 7/2021 .......... H04W 36/085
CN 112069977 A 12/2020
(Continued)

OTHER PUBLICATIONS

International Search Report and Written Opinion—PCT/CN2021/110424—ISA/EPO—Apr. 25, 2022.
(Continued)

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a first user equipment (UE) may receive an indication on whether to switch from a first machine learning (ML) group to a second ML group or to continue with the first ML group. The UE may switch to the second ML group if the indication is to switch or continuing with the first ML group if the indication is to continue. The UE may perform a first action associated with wireless communication based at least in part on a first model developed with the first ML group if the indication is to continue. The UE may perform a second action associated with wireless communication based at least in part on a second model developed with the second ML group if the indication is to switch. Numerous other aspects are described.

30 Claims, 12 Drawing Sheets

(56) References Cited

U.S. PATENT DOCUMENTS

| | | | | |
|---|---|---|---|---|
| 11,621,805 | B2 * | 4/2023 | Shrestha | H04W 24/08 370/329 |
| 11,647,456 | B2 * | 5/2023 | Zhang | H04L 1/1864 370/318 |
| 11,770,182 | B2 * | 9/2023 | Khan | H04B 7/18519 370/331 |
| 11,863,400 | B2 * | 1/2024 | Ma | H04L 1/0009 |
| 11,928,587 | B2 * | 3/2024 | Wang | G06N 3/045 |
| 12,199,836 | B2 * | 1/2025 | Ma | H04W 28/18 |
| 12,225,390 | B2 | 2/2025 | Pezeshki et al. | |
| 2019/0130300 | A1 | 5/2019 | Perone et al. | |
| 2020/0034665 | A1 | 1/2020 | Ghanta et al. | |
| 2020/0210885 | A1 * | 7/2020 | Arora | G06F 9/5055 |
| 2021/0064996 | A1 * | 3/2021 | Wang | H04L 41/16 |
| 2021/0158151 | A1 * | 5/2021 | Wang | G06N 3/02 |
| 2021/0160149 | A1 * | 5/2021 | Ma | H04L 1/0041 |
| 2021/0219230 | A1 * | 7/2021 | Zhang | H04W 16/28 |
| 2021/0342687 | A1 * | 11/2021 | Wang | G06N 3/08 |
| 2021/0399797 | A1 * | 12/2021 | Khan | H04W 36/085 |
| 2022/0004897 | A1 * | 1/2022 | Jadon | G06N 3/045 |
| 2022/0150221 | A1 * | 5/2022 | Fiumara | G06F 18/24 |
| 2022/0156577 | A1 * | 5/2022 | Jha | G06N 3/08 |
| 2022/0224449 | A1 * | 7/2022 | Shrestha | H04W 76/27 |
| 2022/0294666 | A1 * | 9/2022 | Jeon | H04L 25/0254 |
| 2022/0303820 | A1 * | 9/2022 | Xu | H04L 47/34 |
| 2022/0338189 | A1 * | 10/2022 | Madadi | H04B 17/3913 |
| 2022/0353155 | A1 * | 11/2022 | Ma | H04L 1/0009 |
| 2022/0353803 | A1 * | 11/2022 | Wang | G06N 3/09 |
| 2024/0080247 | A1 * | 3/2024 | Ma | G06N 3/08 |
| 2024/0135247 | A1 * | 4/2024 | Johnsson | G06N 20/00 |
| 2024/0137783 | A1 * | 4/2024 | Kovács | H04W 24/02 |
| 2024/0214840 | A1 * | 6/2024 | Kim | H04W 88/08 |
| 2024/0236713 | A9 * | 7/2024 | Kovács | H04W 24/02 |
| 2024/0267710 | A1 * | 8/2024 | Ren | H04L 41/145 |
| 2024/0334462 | A1 * | 10/2024 | Chen | H04W 72/51 |
| 2024/0378500 | A1 * | 11/2024 | Chalkidis | G06N 20/00 |
| 2025/0159532 | A1 * | 5/2025 | Saber | H04W 24/10 |
| 2025/0193091 | A1 * | 6/2025 | Ma | H04W 28/26 |
| 2025/0247189 | A1 * | 7/2025 | Wang | H04L 41/16 |
| 2026/0059398 | A1 * | 2/2026 | Kumar | H04W 36/0061 |

FOREIGN PATENT DOCUMENTS

| | | | | | |
|---|---|---|---|---|---|
| CN | 114175051 | A | * | 3/2022 | G06N 3/044 |
| CN | 114788319 | A | * | 7/2022 | H04W 72/20 |
| CN | 117044125 | A | * | 11/2023 | H04B 7/065 |
| CN | 117730317 | A | * | 3/2024 | G06F 18/285 |
| CN | 114788319 | B | * | 6/2024 | H04L 1/0009 |
| CN | 118473918 | A | * | 8/2024 | H04L 1/0009 |
| CN | 114175051 | B | * | 4/2025 | G06N 3/0464 |
| EP | 4315673 | A1 | | 2/2024 | |
| GB | 2627247 | A | * | 8/2024 | H04W 4/50 |
| JP | 2022544096 | A | * | 10/2022 | G06N 3/045 |
| JP | 2023503111 | A | * | 1/2023 | H04L 1/0009 |
| JP | 7305892 | B2 | * | 7/2023 | H04L 1/0009 |
| JP | 7341315 | B2 | * | 9/2023 | G06N 3/0464 |
| JP | 2026501654 | A | * | 1/2026 | H04W 4/50 |
| KR | 20220100647 | A | * | 7/2022 | H04W 72/20 |
| KR | 20230156362 | A | * | 11/2023 | H04W 36/38 |
| KR | 20230169948 | A | * | 12/2023 | H04B 7/065 |
| KR | 102825675 | B1 | * | 6/2025 | H04W 72/1273 |
| KR | 20250106314 | A | * | 7/2025 | H04W 72/1273 |
| KR | 20250169273 | A | * | 12/2025 | G06F 1/3287 |
| WO | WO-2019171468 | A1 | | 9/2019 | |
| WO | WO-2020075044 | A1 | * | 4/2020 | H04B 7/18519 |
| WO | WO-2020075270 | A1 | | 4/2020 | |
| WO | WO-2020254859 | A1 | | 12/2020 | |
| WO | WO-2021029889 | A1 | * | 2/2021 | G06N 3/045 |
| WO | 2021041921 | A1 | | 3/2021 | |
| WO | 2021142637 | A1 | | 7/2021 | |
| WO | WO-2021142484 | A1 | * | 7/2021 | H04W 72/23 |
| WO | 2022104334 | | | 5/2022 | |
| WO | WO-2022186659 | A1 | * | 9/2022 | H04B 17/3913 |
| WO | 2022212253 | A1 | | 10/2022 | |
| WO | WO-2022220642 | A1 | * | 10/2022 | H04W 72/542 |
| WO | WO-2024171940 | A1 | * | 8/2024 | H04W 4/50 |
| WO | WO-2024208498 | A1 | * | 10/2024 | G06F 1/3287 |
| WO | WO-2024229632 | A1 | * | 11/2024 | H04W 24/02 |
| WO | WO-2025234481 | A1 | * | 11/2025 | G06N 20/00 |

OTHER PUBLICATIONS

Nokia, et al., "General Principles of ML Functionality in RAN", 3GPP TSG-RAN WG3 Meeting #112-e, R3-212374, E-meeting, May 17-May 27, 2021, May 6, 2021(May 6, 2021), Sections 2-3, 2 Pages.

Supplementary European Search Report—EP21952211—Search Authority—Munich—Feb. 27, 2025.

* cited by examiner

MACHINE LEARNING GROUP SWITCHING

CROSS-REFERENCE TO RELATED APPLICATION

This Patent Application is a 371 national stage of PCT Application No. PCT/CN2021/110424, filed on Aug. 4, 2021, entitled "MACHINE LEARNING GROUP SWITCHING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for switching machine learning groups.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include receiving an indication on whether to switch from a first machine learning (ML) group to a second ML group or to continue with the first ML group. The method may include switching to the second ML group if the indication is to switch or continuing with the first ML group if the indication is to continue. The method may include performing a first action associated with wireless communication based at least in part on a first model developed with the first ML group if the indication is to continue or a second action associated with wireless communication based at least in part on a second model developed with the second ML group if the indication is to switch.

Some aspects described herein relate to a method of wireless communication performed by a first UE. The method may include switching from a first ML group to a second ML group based at least in part on one or more of a switching rule, an ML group configuration, a model configuration, or an expiration of a timer. The method may include performing an action associated with wireless communication based at least in part on a model developed with the second ML group.

Some aspects described herein relate to a method of wireless communication performed by a base station. The method may include generating an indication on whether a UE is to switch from a first ML group to a second ML group or to continue with the first ML group. The method may include transmitting the indication to the UE.

Some aspects described herein relate to a first UE for wireless communication. The first user equipment may include a memory and one or more processors coupled to the memory. The one or more processors may be configured to receive an indication on whether to switch from a first ML group to a second ML group or to continue with the first ML group. The one or more processors may be configured to switch to the second ML group if the indication is to switch or continuing with the first ML group if the indication is to continue. The one or more processors may be configured to perform a first action associated with wireless communication based at least in part on a first model developed with the first ML group if the indication is to continue or a second action associated with wireless communication based at least in part on a second model developed with the second ML group if the indication is to switch.

Some aspects described herein relate to a UE for wireless communication. The UE may include a memory and one or more processors coupled to the memory. The one or more processors may be configured to switch from a first ML group to a second ML group based at least in part on one or more of a switching rule, an ML group configuration, a model configuration, or an expiration of a timer. The one or more processors may be configured to perform an action associated with wireless communication based at least in part on a model developed with the second ML group.

Some aspects described herein relate to a base station for wireless communication. The base station may include a memory and one or more processors coupled to the memory. The one or more processors may be configured to generate an indication on whether a UE is to switch from a first ML group to a second ML group or to continue with the first ML group. The one or more processors may be configured to transmit the indication to the UE.

Some aspects described herein relate to a non-transitory computer-readable medium that stores a set of instructions for wireless communication by a first UE. The set of instructions, when executed by one or more processors of the UE, may cause the UE to receive an indication on whether to switch from a first ML group to a second ML group or to continue with the first ML group. The set of instructions, when executed by one or more processors of the UE, may cause the UE to switch to the second ML group if the indication is to switch or continuing with the first ML group if the indication is to continue. The set of instructions, when executed by one or more processors of the UE, may cause the UE to perform a first action associated with wireless communication based at least in part on a first model developed with the first ML group if the indication is to continue or a second action associated with wireless communication based at least in part on a second model developed with the second ML group if the indication is to switch.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to switch from a first ML group to a second ML group based at least in part on one or more of a switching rule, an ML group configuration, a model configuration, or an expiration of a timer. The set of instructions, when executed by one or more processors of the one or more instructions that, when executed by one or more processors of a UE, may cause the one or more instructions that, when executed by one or more processors of a UE to perform an action associated with wireless communication based at least in part on a model developed with the second ML group.

Some aspects described herein relate to a non-transitory computer-readable medium that stores a set of instructions for wireless communication by a base station. The set of instructions, when executed by one or more processors of the base station, may cause the base station to generate an indication on whether a UE is to switch from a first ML group to a second ML group or to continue with the first ML group. The set of instructions, when executed by one or more processors of the base station, may cause the base station to transmit the indication to the UE.

Some aspects described herein relate to an apparatus for wireless communication. The apparatus may include means for receiving an indication on whether to switch from a first ML group to a second ML group or to continue with the first ML group. The apparatus may include means for switching to the second ML group if the indication is to switch or continuing with the first ML group if the indication is to continue. The apparatus may include means for performing a first action associated with wireless communication based at least in part on a first model developed with the first ML group if the indication is to continue or a second action associated with wireless communication based at least in part on a second model developed with the second ML group if the indication is to switch.

Some aspects described herein relate to an apparatus for wireless communication. The apparatus may include means for switching from a first ML group to a second ML group based at least in part on one or more of a switching rule, an ML group configuration, a model configuration, or an expiration of a timer. The apparatus may include means for performing an action associated with wireless communication based at least in part on a model developed with the second ML group.

Some aspects described herein relate to an apparatus for wireless communication. The apparatus may include means for generating an indication on whether a UE is to switch from a first ML group to a second ML group or to continue with the first ML group. The apparatus may include means for transmitting the indication to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
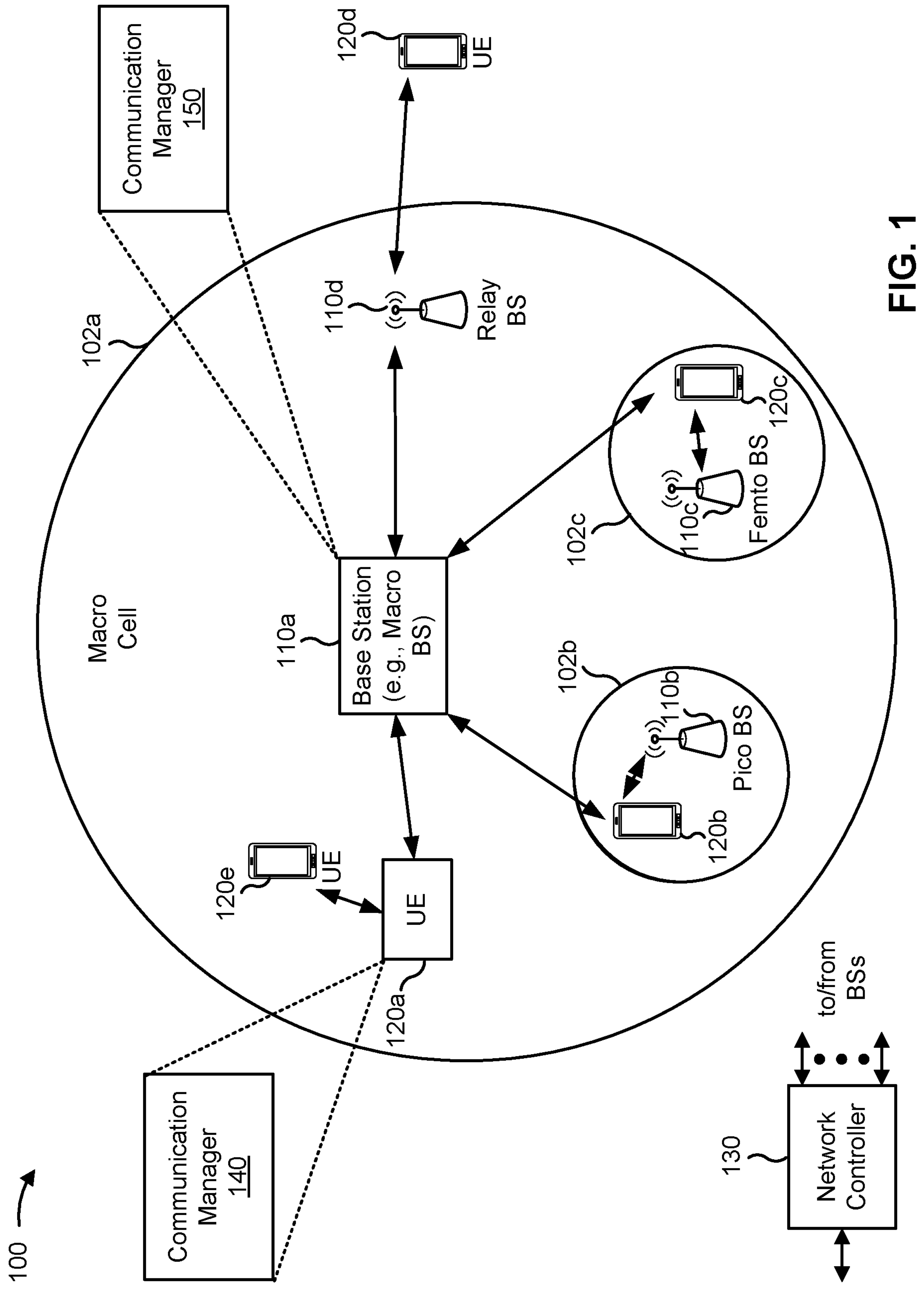
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication on whether to switch from a first machine learning (ML) group to a second ML group or to continue with the first ML group and switch to the second ML group if the indication is to switch or continuing with the first ML group if the indication is to continue. The communication manager 140 may perform a first action associated with wireless communication based at least in part on a first model developed with the first ML group if the indication is to continue or a second action associated with wireless communication based at least in part on a second model developed with the second ML group if the indication is to switch. Additionally, or alternatively, the communication manager 140 may perform one or more other operations described herein.

In some aspects, the UE 120 may include a communication manager 140. As described in more detail elsewhere herein, the communication manager 140 may switch from a first ML group to a second ML group based at least in part on one or more of a switching rule, a model configuration, or an expiration of a timer. The communication manager 140 may perform an action associated with wireless communication based at least in part on a model developed with the second ML group. Additionally, or alternatively, the communication manager 140 may perform one or more other operations described herein.

In some aspects, the base station 110 may include a communication manager 150. As described in more detail elsewhere herein, the communication manager 150 may generate an indication on whether a UE is to switch from a first ML group to a second ML group or to continue with the first ML group and transmit the indication to the UE. Additionally, or alternatively, the communication manager 150 may perform one or more other operations described herein.

As indicated above, FIG. 1 is provided as an example. Other examples may differ from what is described with regard to FIG. 1.

Figure 2:
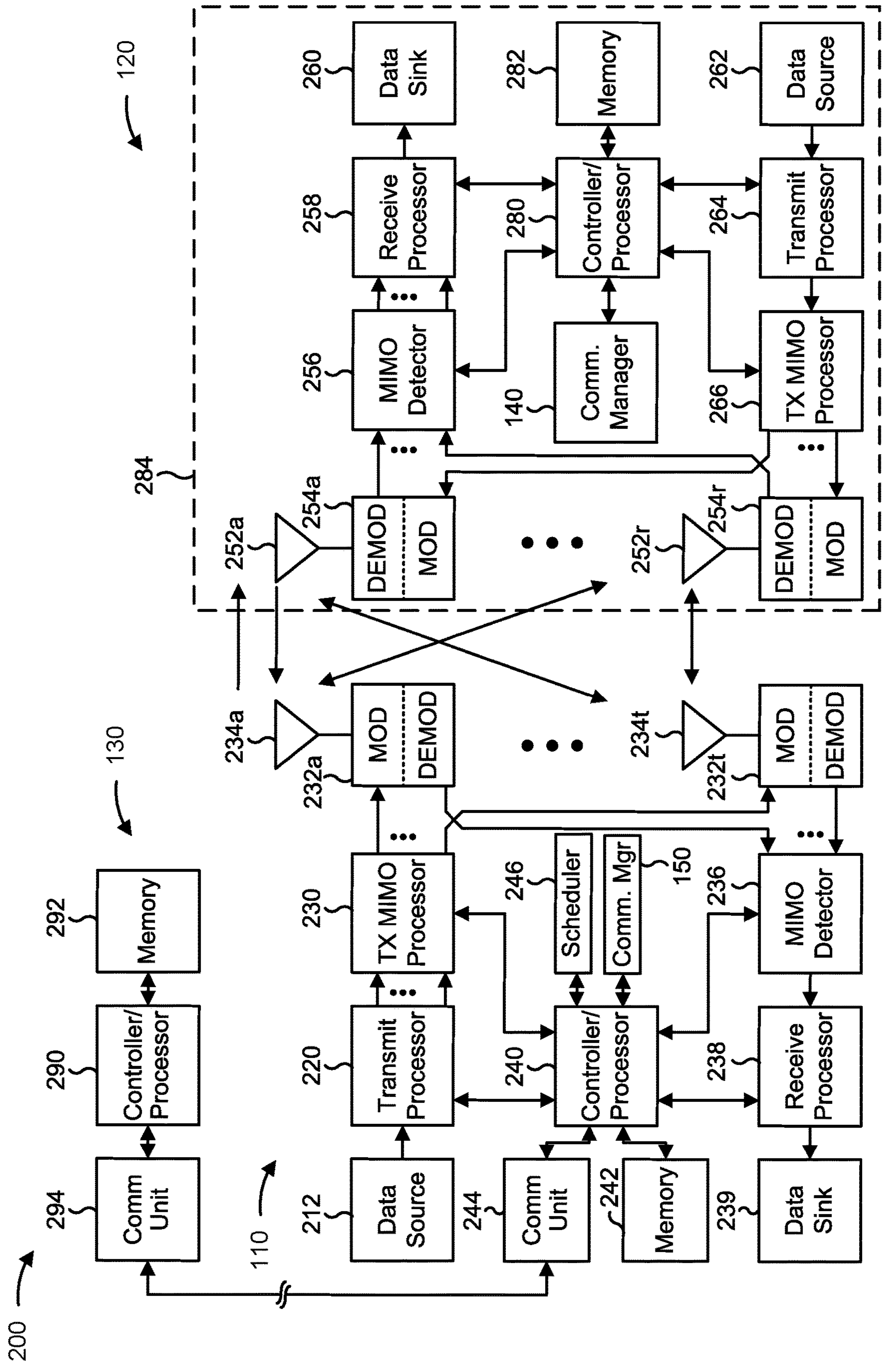
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols to the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with switching ML groups, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first UE (e.g., UE 120) includes means for receiving an indication on whether to switch from a first ML group to a second ML group or to continue with the first ML group, means for switching to the second ML group if the indication is to switch or continuing with the first ML group if the indication is to continue, and/or means for performing a first action associated with wireless communication based at least in part on a first model developed with the first ML group if the indication is to continue or a second action associated with wireless communication based at least in part on a second model developed with the second ML group if the indication is to switch. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first UE includes means for switching from a first ML group to a second ML group based at least in part on one or more of a switching rule, a model configuration, or an expiration of a timer; and/or means for performing an action associated with wireless communication based at least in part on a model developed with the second ML group. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for generating an indication on whether a UE is to switch from a first ML group to a second ML group or to continue with the first ML group, and/or means for transmitting the indication to the UE. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
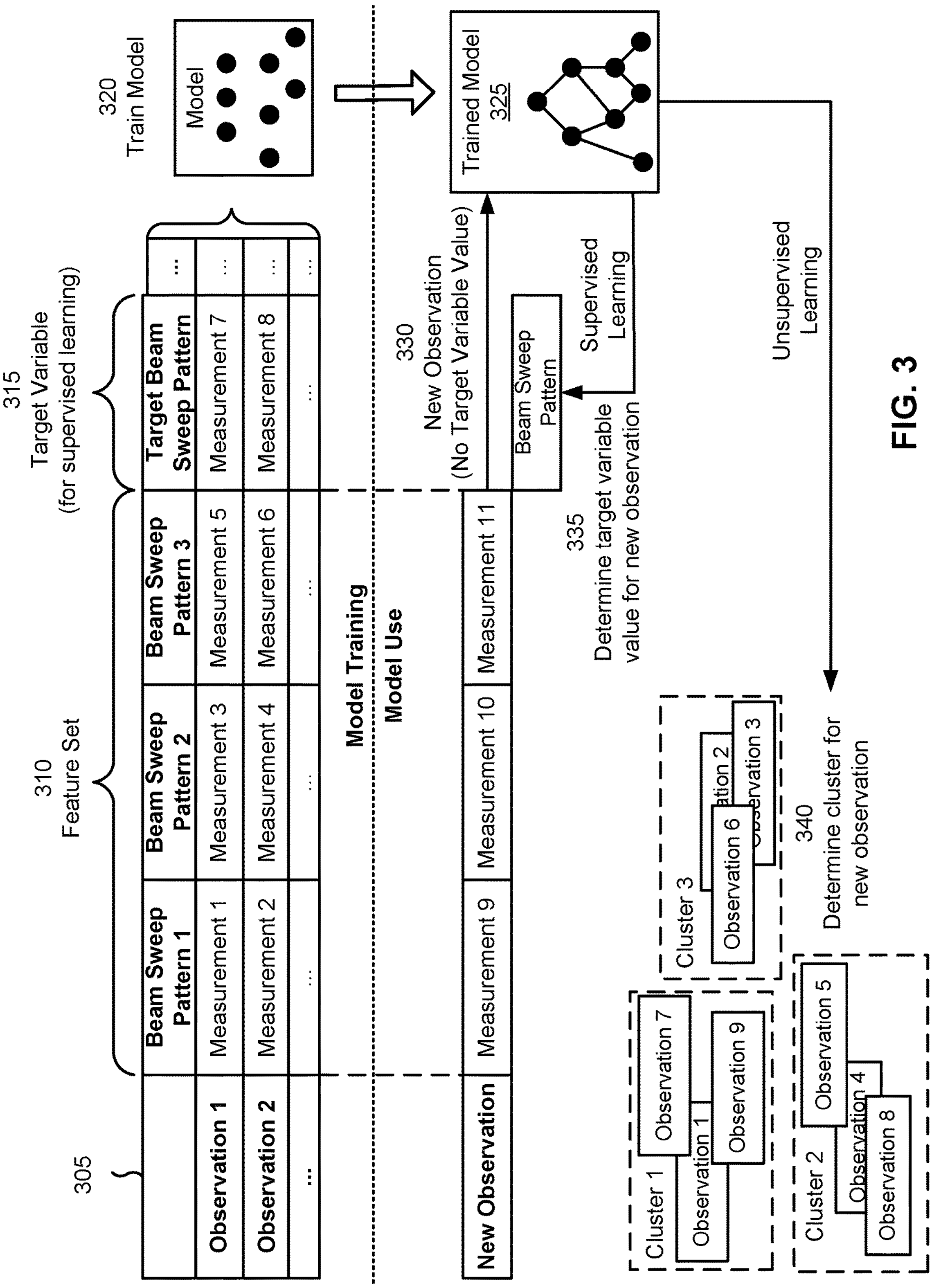
FIG. 3 is a diagram illustrating an example of training and using a machine learning (ML) model in connection with wireless communications, in accordance with the present disclosure.

FIG. 3 is a diagram illustrating an example 300 of training and using an ML model in connection with wireless communications, in accordance with the present disclosure. The ML model training and usage described herein may be performed using an ML system. The ML system may include or may be included in a computing device, a server, a cloud computing environment, a base station, or a UE.

As shown by reference number 305, an ML model may be trained using a set of observations. The set of observations may be obtained from training data (e.g., historical data), such as data gathered during one or more processes described herein. In some implementations, the ML system may receive the set of observations (e.g., as input) from measurements, statistics, or another device, such as a base station or a UE, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the ML system may determine variables for a set of observations and/or variable values for a specific observation based on input received from measurement, statistics, or another device. For example, the ML system may identify a feature set (e.g., one or more features and/or feature values) by extracting the feature set from structured data, by performing natural language processing to extract the feature set from unstructured data, and/or by receiving input from an operator.

As an example, ML may be used to determine a target beam sweep pattern for beam management. A feature set for a set of observations may include a first beam sweep pattern, a second beam sweep pattern, a third beam sweep pattern, and so on. As shown, for a first observation, the first feature may have a first measurement value, the second feature may have a second measurement value, the third feature may have a third measurement value, and so on. The measurement values or statistics may include an RSRP, an RSRQ, an RSSI, a signal-to-interference-plus noise ratio (SINR), latency, a block error rate (BLER), a beamforming gain, and/or the like. These features and feature values are provided as examples and may differ in other examples. For example, the feature set may include or relate to one or more other features, such as: UE positioning, channel state information (CSI) feedback (CSF) (e.g., CQI, precoding matrix index (PMI), rank indication (RI)), handover, beam management (e.g., measurement of reference signals, beam selection), decoding, and/or channel estimation.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a target beam seep pattern, which has a measurement value for the first observation.

The feature set and target variable described above are provided as examples, and other examples may differ from what is described above. For example, for a target variable of channel estimation, the feature set may include different DMRS patterns.

The target variable may represent a value that an ML model is being trained to predict, and the feature set may represent the variables that are input to a trained ML model to predict a value for the target variable. The set of observations may include target variable values so that the ML model can be trained to recognize patterns in the feature set that lead to a target variable value. An ML model that is trained to predict a target variable value may be referred to as a supervised learning model.

In some implementations, the ML model may be trained on a set of observations that do not include a target variable. This may be referred to as an unsupervised learning model. In this case, the ML model may learn patterns from the set of observations without labeling or supervision, and may provide output that indicates such patterns, such as by using clustering and/or association to identify related groups of items within the set of observations.

As shown by reference number 320, the ML system may train an ML model using the set of observations and using one or more ML algorithms, such as a regression algorithm, a decision tree algorithm, a neural network algorithm, a k-nearest neighbor algorithm, a support vector machine algorithm, or the like. After training, the ML system may store the ML model as a trained ML model 325 to be used to analyze new observations.

As shown by reference number 330, the ML system may apply the trained ML model 325 to a new observation, such as by receiving a new observation and inputting the new observation to the trained ML model 325. As shown, the new observation may include a first feature of a first beam sweep pattern, a second feature of a second beam sweep pattern, a third feature of a third beam sweep pattern, and so on, as an example. The ML system may apply the trained ML model 325 to the new observation to generate an output (e.g., a result). The type of output may depend on the type of ML model and/or the type of ML task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained ML model 325 may predict a value of a measurement (e.g., average RSRP or SINR of beams) for the target variable of the target beam sweep pattern for the new observation, as shown by reference number 335. Based on this prediction, the ML system may provide a first recommendation, may provide output for determination of a first recommendation, may perform a first automated action, and/or may cause a first automated action to be performed (e.g., by instructing another device to perform the automated action), among other examples. The first recommendation may include, for example, a recommended beam sweep pattern. The first automated action may include, for example, configuring a UE to use the recommended beam sweep pattern.

In some implementations, the trained ML model 325 may classify (e.g., cluster) the new observation in a cluster, as shown by reference number 340. The observations within a cluster may have a threshold degree of similarity. As an example, if the ML system classifies the new observation in a first cluster, then the ML system may provide a first recommendation, such as the first recommendation described above. Additionally, or alternatively, the ML system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In this way, the ML system may apply a rigorous and automated process to features associated with wireless communication. The ML system enables recognition and/or identification of tens, hundreds, thousands, or millions of features and/or feature values for tens, hundreds, thousands, or millions of observations, thereby increasing accuracy and consistency and reducing delay associated with determining a target beam sweep pattern relative to requiring computing resources to be allocated for tens, hundreds, or thousands of operators to manually trying different beams at different times, using the features or feature values.

In a portion of a wireless communication device, a UE, a base station, or other network device that utilizes ML or performs ML inference (process of running live data points into an ML algorithm), there may be multiple ML models that are configured and triggered. These ML models could be specified for different application functions or could be different versions for the same application function. The ML models may be optimized with different generalization capabilities (e.g., UE-specific or cell-specific) and/or designed with different complexity requirements (e.g., low-tier UE (IoT device), premium UE).

As indicated above, FIG. 3 is provided as an example. Other examples may differ from what is described in connection with FIG. 3.

Figure 4:
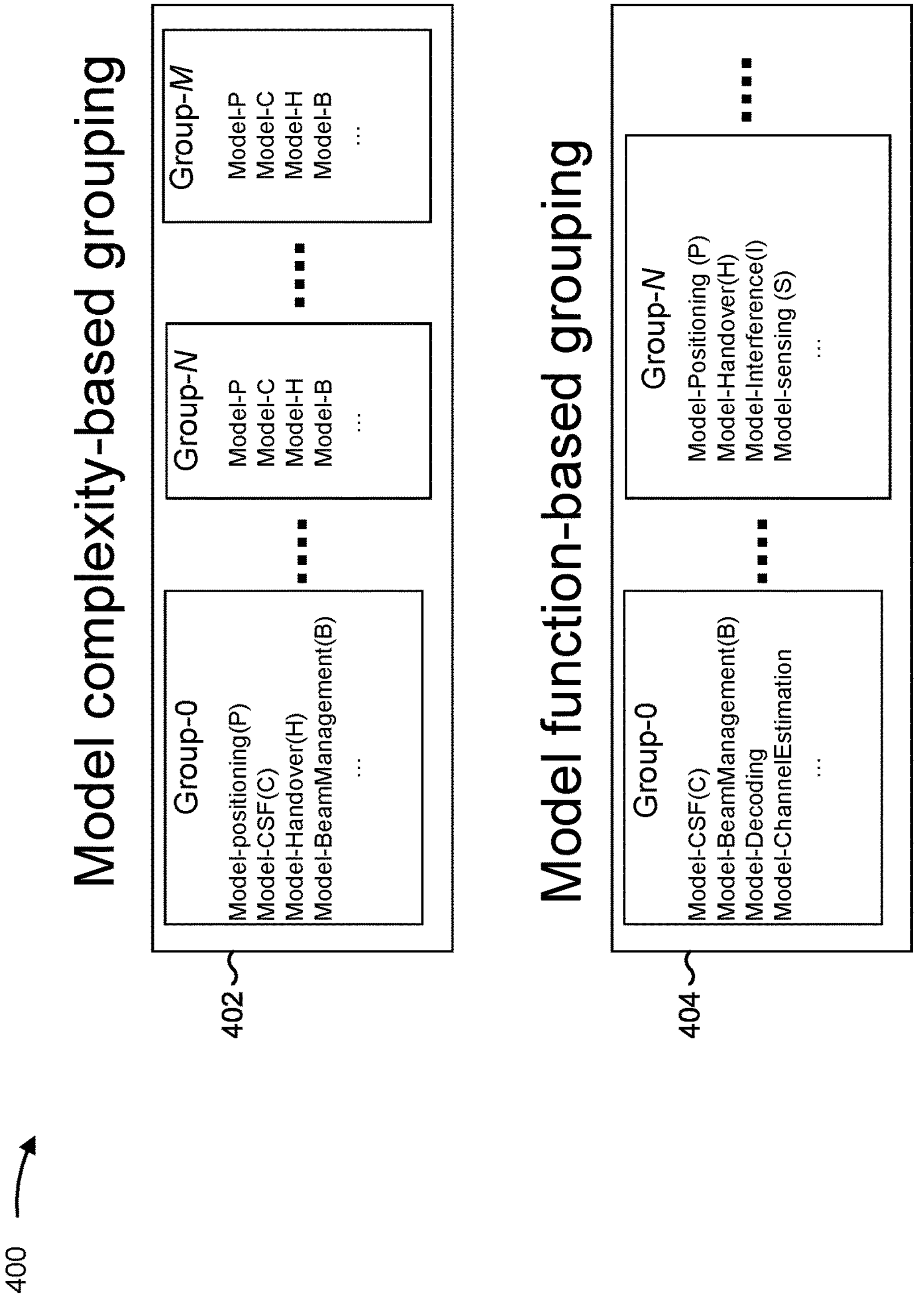
FIG. 4 is a diagram illustrating an example of ML groups, in accordance with the present disclosure.

FIG. 4 is a diagram illustrating an example 400 of ML groups, in accordance with the present disclosure.

ML models may be categorized into different groups to facilitate model management. For example, if physical downlink control channel (PDCCH) resources are limited, separately indicating each ML model would consume more processing resources and signaling resources than triggering different ML groups to adapt to different conditions. ML models may be categorized based on complexity levels, where there is one baseline ML group and some advanced ML groups. ML models may be categorized based on deployment conditions (cell-specific ML groups or UE-specific ML groups). ML models may be categorized based on fallback (ML failure) events (e.g., fallback ML group). There may be normal ML groups, advanced ML groups, or model groups that are considered non-ML groups.

Example 400 shows a first table 402 of ML models that are split into different ML groups. In table 402, each ML group is mapped to one complexity level. Group-0 might be the default, with the lowest complexity requirement. Group-0 may include functions (features) for UE positioning, CSF, handover, and/or beam management. The performance of Group-0 may be the baseline level of complexity, and thus Group-0 may be considered a baseline ML group or an anchor ML group. Table 402 shows more advanced ML groups, such as through Group-N or through Group-M, with higher complexity requirements for the same functions. A low-tier UE (e.g., reduced capacity UE, IoT device) might not support such advanced ML groups. Different UEs may be configured with different groups, based on a complexity requirement.

Table 404 shows models that are grouped based on functions. For example, Group-0 might only include some basic ML models to support the basic necessary functions, such as handling CSF, beam management, decoding, and/or channel estimation. Other ML groups, such as through Group-N and beyond, may include ML models for other functions that may be more advanced, such as positioning, handover, handling interference, and/or channel sensing. Other ML groups may include other advanced functions. There may be other rules for ML model grouping.

As indicated above, FIG. 4 is provided as an example. Other examples may differ from what is described with regard to FIG. 4.

Figure 5A:
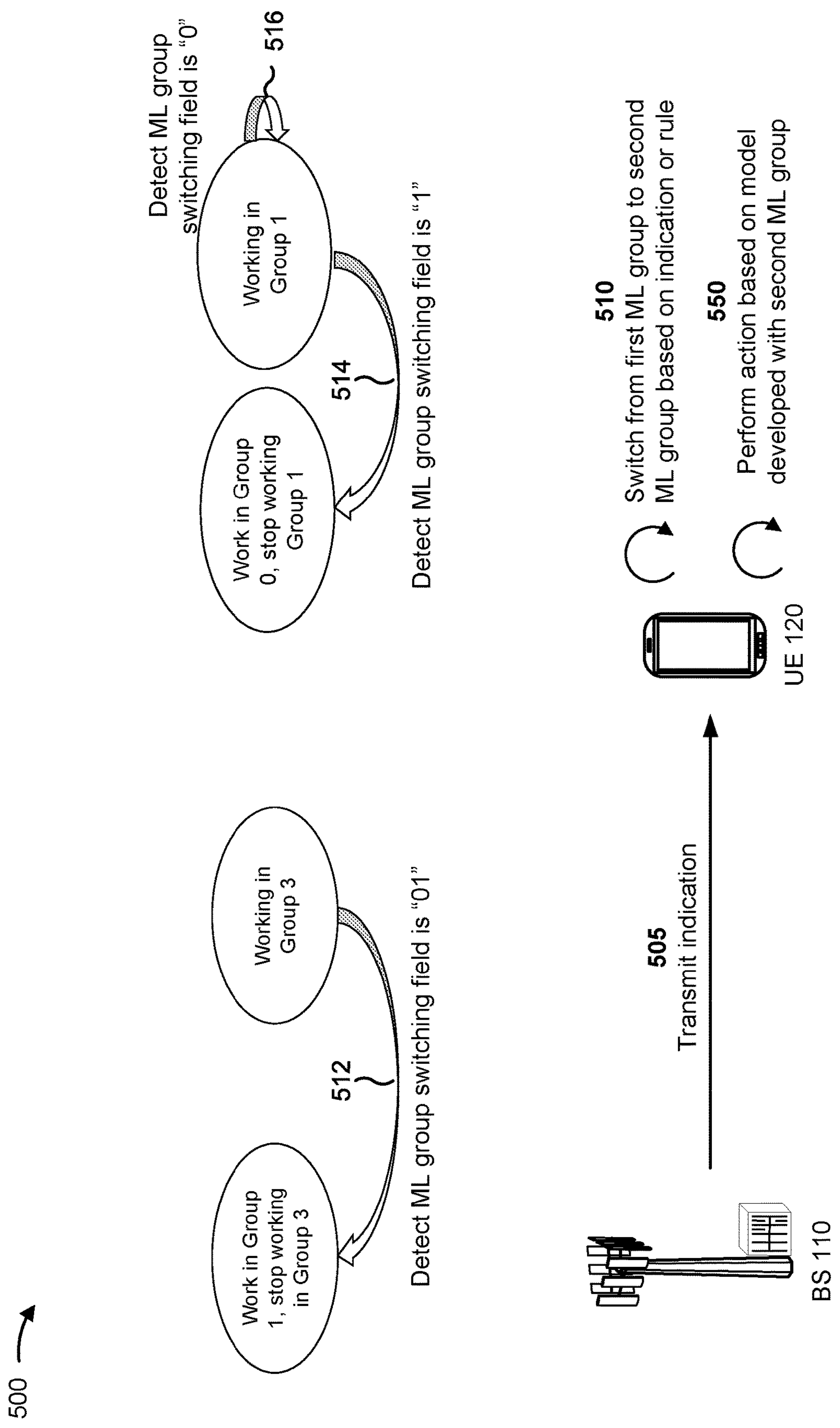
FIGS. 5A-5C are diagrams illustrating an example of ML group switching, in accordance with the present disclosure.
Figure 5B:
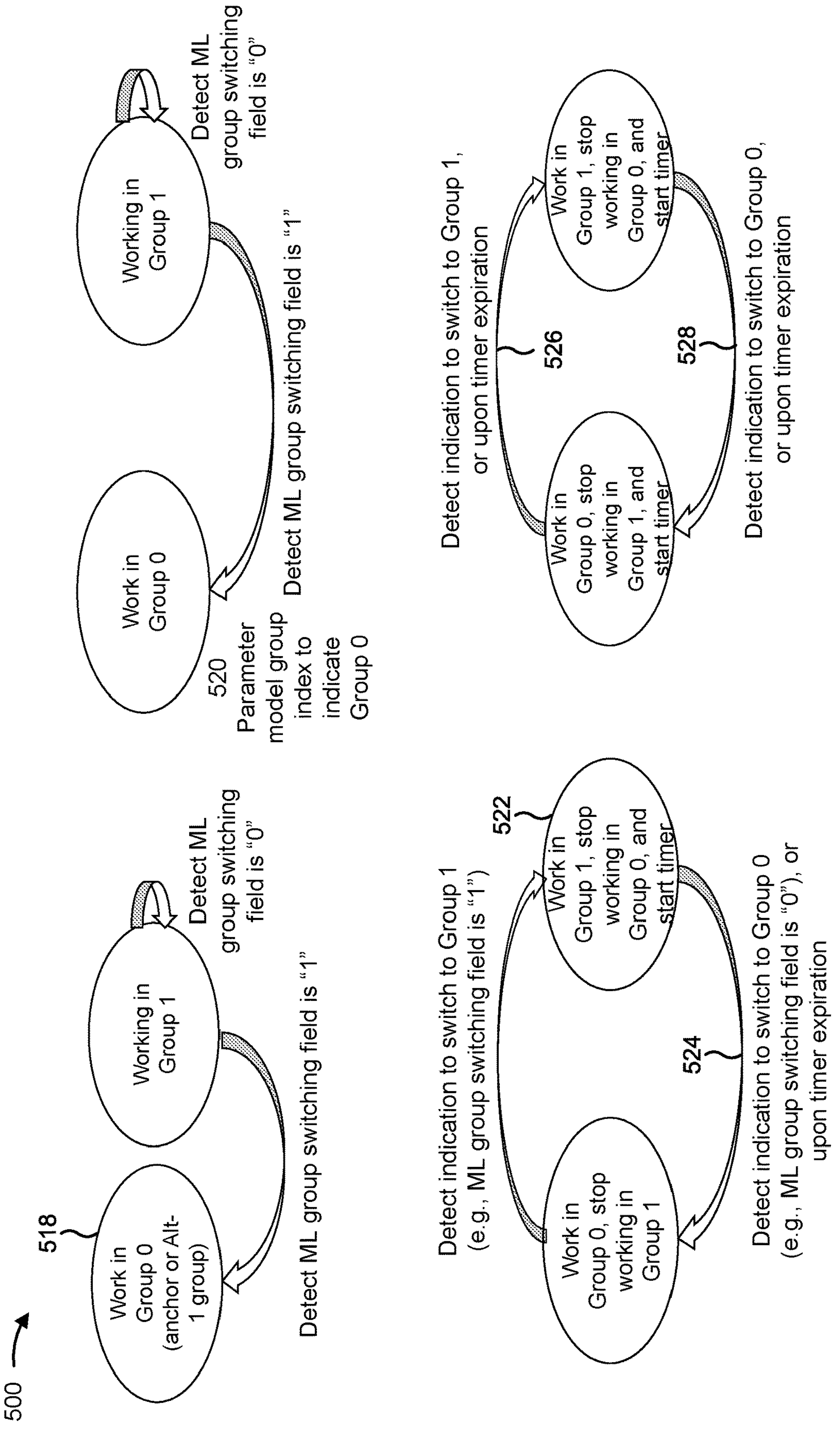
Figure 5C:
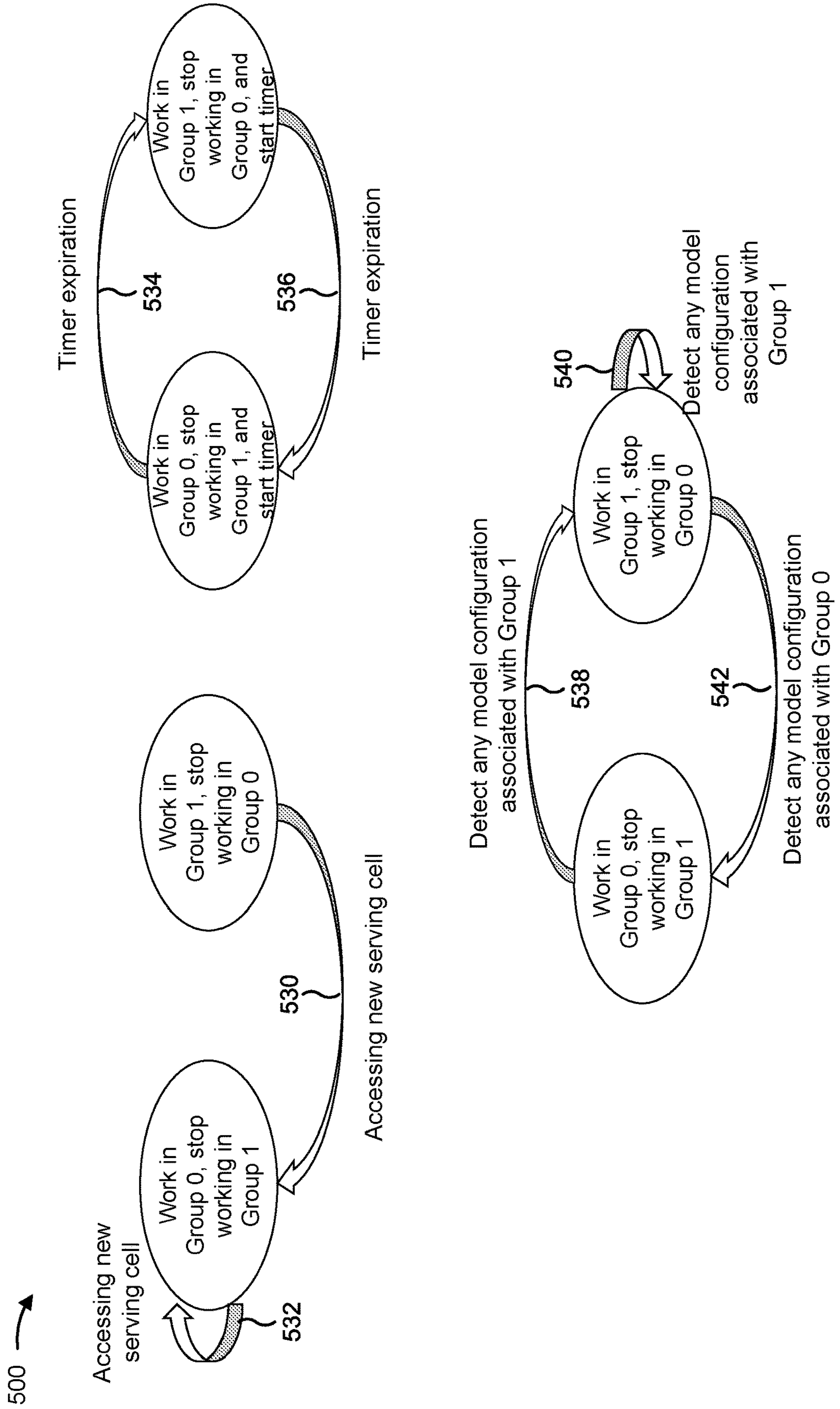

FIGS. 5A-5C are diagrams illustrating an example 500 of ML group switching, in accordance with the present disclosure.

As described in connection with FIG. 4, ML models may be divided into multiple ML groups, which may be mapped to different conditions. ML grouping may facilitate flexible and efficient model management for various and changing conditions, such as a UE moving from outdoor to indoor or moving into a new serving cell. In order to adapt to changing conditions, according to various aspects described herein, a UE (or another device) may trigger a switch to from a first ML group to a second ML group. Flexible ML group switching for various and changing conditions may improve UE and network performance. Flexible ML group switching may also cause the UE to consume fewer processing resources and signaling resources than if individual ML models were separately triggered. Such resource conservation is a bigger gain for low-power devices. The UE may switch ML groups upon receiving an indication to switch or continue in a current ML group upon receiving an indication to continue. The indication may specify a target ML group (for switching or continuing) or include a single bit for switching back to a previous ML group or continuing in the current ML group. Alternatively, or additionally, the UE may switch ML groups or continue in the current ML group based at least in part on a switching rule (e.g., switch ML groups upon entering a new serving cell). The UE may develop an ML model, obtain a recommendation based at least in part on the ML model, and perform an action based at least in part on the recommendation or ML model. The action may be associated with wireless communications and may include, for example, performing a beam switch, obtaining a measurement, providing a report, performing channel estimation, providing feedback, or any other action that corresponds to a feature and/or complexity level of the ML group.

The base station 110 may use radio resource control (RRC) signaling to configure the UE 120 for ML group switching. For example, the base station 110 may configure the UE 120 to use at least two ML groups. In some aspects, one ML group may be an anchor group (Group 0), which may act as a default ML group with a baseline functionality or complexity. Other ML groups (e.g., Group 1) may include more advanced ML models with different functionality and/or complexity. One ML group may have priority over another ML group. In some scenarios, Group 0 may be a conventional non-ML algorithm group. In some aspects, Group 0 and Group 1 may be equal ML groups, where neither ML group is an anchor group or has priority over the other ML group.

The RRC signaling for configuring the ML groups may include multiple parameters, such as a ML group list (e.g., MLGroupList) and/or a location of the ML group switching field in downlink control information (DCI) (e.g., MLGroupSwitchTrigger). The RRC signaling may indicate ML group indices such that the UE 120 is able to switch to a target ML group identified by an ML group index. The RRC signaling may also include a parameter for a time to remain in an ML group (e.g., MLGroupSwitchingTimer). For example, the UE 120 may return to a previous ML group or switch to a target ML group upon expiration of a timer. The timer may be a separate timer that is not associated with any ML group or may be a timer that is associated with one or more ML groups (e.g., one timer for each ML group).

Once the UE 120 is configured with ML groups and for switching ML groups, the UE 120 may be operating in a first ML group and may await an indication to switch (or continue). As shown by reference number 505, the base station 110 (or another device) may transmit the indication. The base station 110 may generate the indication based at least in part on a UE capability, traffic conditions, UE location, and/or other network conditions. The indication may be transmitted in, for example, a field in DCI. The field may be an ML group switching field, and the UE 120 may use information from the RRC parameter MLGroupSwitch Trigger to identify the ML group switching field in the DCI.

The DCI may be a group common DCI, and different UEs may monitor the DCI for the ML group switching field that applies. The ML group switching field may be one bit or multiple bits (depending on the size of the ML group list).

As shown by FIG. 5A, and by reference number 510, the UE 120 may switch from the first ML group to a second ML group based at least in part on the indication. The UE 120 may stop working with ML models associated with the first ML group and start working with ML models associated with the second ML group. In some aspects, the indication instructs the UE 120 to switch ML groups and identifies the second ML group (target ML group) to which the UE 120 is to switch. For example, as shown by reference number 512, the UE 120 may be using Group 3 for developing models, obtaining recommendations, monitoring, or model training. The UE 120 may detect that the ML group switching field bits are "01". These bits may indicate that the UE 120 is to switch ML groups and may also identify an ML group index that corresponds to Group 1 (target ML group). Accordingly, the UE 120 switches from Group 3 to Group 1. If there are only two groups in the configured ML group list, the bit length of the ML group switching field may be one bit, where a bit value of "0" indicates the first ML group and a value of "1" indicates the second ML group. If there are 3 or 4 groups, for example, the ML group switching field may include 2 bits to indicate the ML group index (or model group index) of the target ML group. In some aspects, the base station 110 may transmit an indication of the second ML group or a third ML group via DCI, a medium access control control element (MAC CE), or an RRC message.

In some aspects, the indication may be a single bit to conserve signaling resources. The bit may indicate whether the UE 120 is to switch to a target ML group or to continue in the current ML group. The target ML group may be defined within the ML group list. If there are only two ML groups in the ML group list, a bit value of "0" may refer to the first ML group in the ML group list, and a bit value of "1" may refer to the second ML group in the ML group list. For example, the UE 120 may be using Group 1. If the ML group switching field has a bit with value "1", the UE 120 may switch ML groups, as shown by reference number 514. This may involve returning to a previous ML group, such as Group 0. If the ML group switching field has a bit with value "0", the UE 120 may continue in Group 1, as shown by reference number 516.

In some aspects, the target ML group may be an anchor group, a previous group, or an otherwise configured alternate ML group to which the UE 120 is to switch. For example, as shown by FIG. 5B and by reference number 518, Group 0 may be an anchor group or an alternate ML group that was previously identified or configured.

In some aspects, as shown by FIG. 5B and by reference number 520, if the ML group switching field has a bit with value "1", the UE 120 may switch ML groups, but switch to a group that is indicated by another parameter (e.g., model group index). This may apply when there is only one bit in the ML group switching field, but there are more than two groups. The base station 110 may indicate the model group index of the target ML group in DCU, a MAC CE, or an RRC message.

In some aspects, as shown by FIG. 5B and by reference number 522, once an ML group switch is triggered, the UE 120 may start a timer that was configured by RRC parameter MLGroupSwitchingTimer. As shown by reference number 524, once the timer expires, the UE 120 may return to the previous group (Group 0), an anchor group, or an otherwise designated ML group. The timer may be a timer that applies for all ML groups. Alternatively, the timer may be a timer that applies only to certain ML groups, such as only to non-anchor groups. There may also be ML group-specific timers. When a timer is configured, ML group switching may be based at least in part on the timer and the indication. If a timer is not configured, the ML group switching may be based at least in part on the indication.

In some aspects, the UE 120 may switch back to the previous ML group at a last slot of a remaining channel occupancy duration (before expiration of timer or in addition to expiration of the timer). The base station 110 may indicate the channel occupancy duration to the UE 120, such as part of the ML group switching field in the DCI.

In some aspects, there may be no anchor group to return to upon expiration of a timer. The UE 120 may switch between ML groups based at least in part on an indication, multiple timers, and/or reuse of the same timer. For example, as shown by FIG. 5B and by reference number 526, the UE 120 may switch from Group 0 to Group 1 after receiving an indication (e.g., bit in ML group switching field) or upon expiration of a timer. The UE 120 may start another timer specific to Group 1 or restart the same timer. As shown by reference number 528, the UE 120 may switch from Group 1 to Group 0 after receiving an indication or upon expiration of the most recent timer. If there are more than two groups, the UE 120 may use an additional parameter that indicates a model group index of the target ML group.

As shown by reference number 510 in FIG. 5A, the UE 120 may also switch ML groups based at least in part on a rule. The rule may correspond to actions that would make one ML group apply more than another ML group. For example, the first ML group (Group 1) may apply to functions or conditions in a current serving cell, and a second ML group (Group 0) may apply to more advanced functions or differing conditions in a new serving cell. Therefore, as shown by FIG. 5C and by reference number 530, if the UE 120 enters the new serving cell, the UE 120 may switch from Group 1 to Group 0 upon entering the new serving cell. Group 0 may be an anchor cell. No indication in DCI is used for the ML group switch. ML group switching by rule and without an indication may be referred to as "implicit ML group switching." If the UE 120 enters another new serving cell, the UE 120 may remain in Group 0, as shown by reference number 532.

In some aspects, rules for implicit ML group switching may be based at least in part on timers, without explicit indications. For example, as shown by FIG. 5C and by reference number 534, upon expiration of a first timer, the UE 120 may switch from Group 0 to Group 1, upon which a second timer is started. Upon expiration of the second timer, as shown by reference number 536, the UE 120 may return to Group 0 or switch to a third ML group, where the first timer is restarted or a third timer is started. The base station 110 may configure the timers at the UE 120 based at least in part on predicted functions that may be used, predicted traffic conditions, predicted locations, predicted complexity, or other predicted conditions.

The UE 120 may perform implicit ML group switching if the UE 120 is not configured with an ML group switch trigger or if the UE 120 is otherwise configured with one or more rules for ML group switching. In some aspects, a specific ML group or specific ML model may be configured for implicit ML group switching. In some aspects, a rule may include switching to a target ML group when ML models are received for the target ML group, or if the UE 120 is configured for ML models from the target ML group. For example, as shown by FIG. 5C and by reference number 538, if the UE 120 detects any model configuration associated with Group 1, the UE 120 may switch to Group 1. As shown by reference number 540, if the UE 120 works with new ML models and detects that they are also associated with Group 1, the UE 120 may continue in Group 1. As shown by reference number 542, if the UE 120 detects that the UE 120 is working with ML models associated with Group 0, the UE 120 may switch to Group 0.

By dynamically switching ML groups (by indication or rule) rather than triggering individual ML models, the base station 110 and the UE 120 may reduce latency while conserving processing resources and signaling resources. While ML group switching has been described for UE 120 in example 500, ML group switching may also be applied to other wireless communication devices, including reduced capacity devices. ML group switching may also be applied to the base station 110 or other network devices.

As shown by reference number 550 in FIG. 5A, UE 120 may perform an action based at least in part on one or more ML models developed with the second ML group (or first ML group if there is no switch). For example, the ML models may produce recommendations that the UE 120 may accept and execute. The action may be associated with wireless communication and may correspond to one or more of the features or functionalities described in connection with FIG. 4. The action may also include further ML model training.

As indicated above, FIGS. 5A-5C provide some examples. Other examples may differ from what is described with regard to FIGS. 5A-5C.

Figure 6:
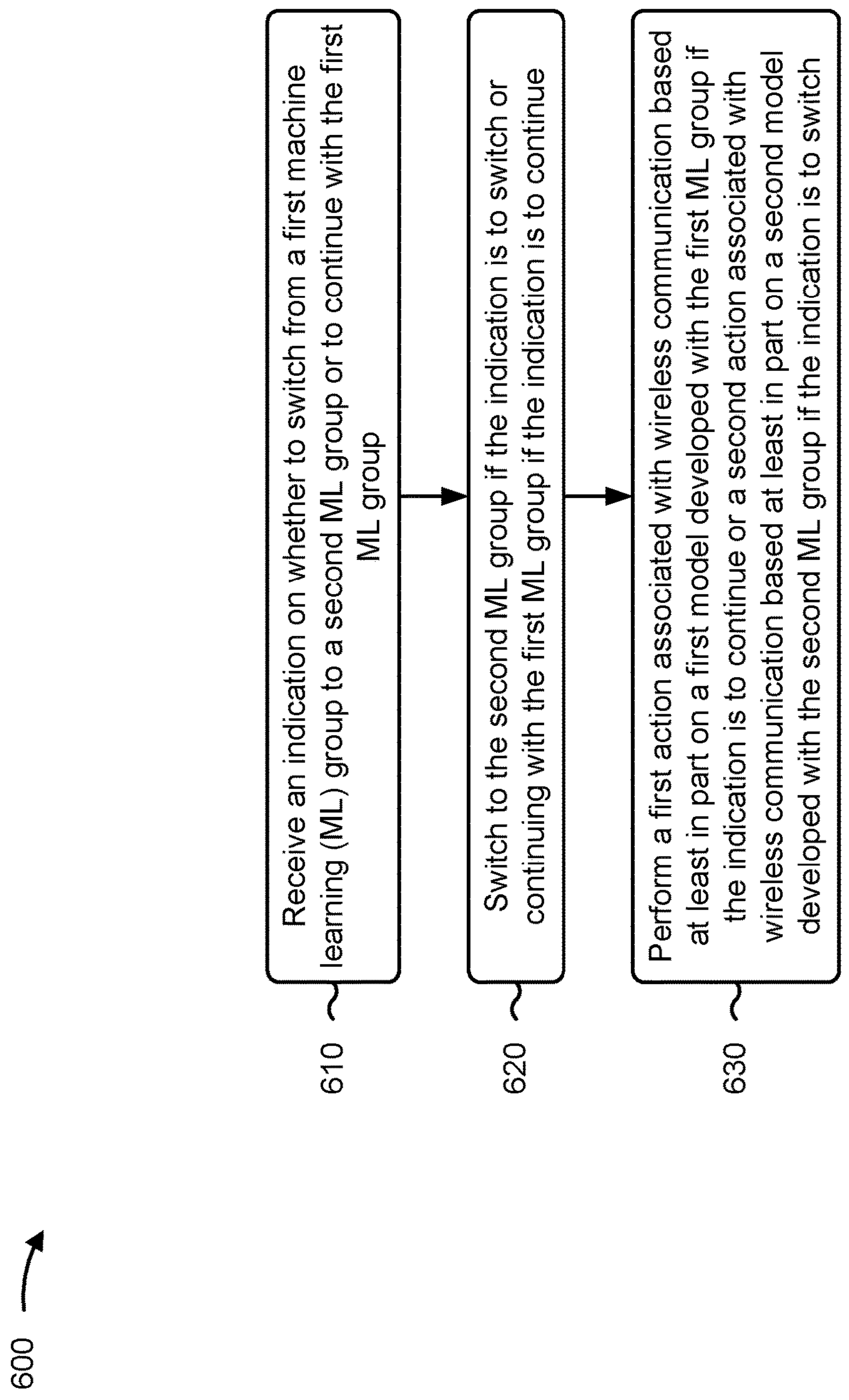
FIG. 6 is a diagram illustrating an example process performed, for example, by a first UE, in accordance with the present disclosure.

FIG. 6 is a diagram illustrating an example process 600 performed, for example, by a first UE, in accordance with the present disclosure. Example process 600 is an example where the UE (e.g., UE 120) performs operations associated with ML group switching.

As shown in FIG. 6, in some aspects, process 600 may include receiving an indication on whether to switch from a first ML group to a second ML group or to continue with the first ML group (block 610). For example, the UE (e.g., using communication manager 140 and/or reception component 902 depicted in FIG. 9) may receive an indication on whether to switch from a first ML group to a second ML group or to continue with the first ML group, as described above in connection with FIGS. 3-5.

As further shown in FIG. 6, in some aspects, process 600 may include switching to the second ML group if the indication is to switch or continuing with the first ML group if the indication is to continue (block 620). For example, the UE (e.g., using communication manager 140 and/or switching component 908 depicted in FIG. 9) may switch to the second ML group if the indication is to switch or continuing with the first ML group if the indication is to continue, as described above in connection with FIGS. 3-5.

As further shown in FIG. 6, in some aspects, process 600 may include performing a first action associated with wireless communication based at least in part on a first model developed with the first ML group if the indication is to continue or a second action associated with wireless communication based at least in part on a second model developed with the second ML group if the indication is to switch (block 630). For example, the UE (e.g., using communication manager 140, reception component 902, transmission component 904, and/or performing component 910 depicted in FIG. 9) may perform a first action associated with wireless communication based at least in part on a first model developed with the first ML group if the indication is to continue or a second action associated with wireless communication based at least in part on a second model developed with the second ML group if the indication is to switch, as described above in connection with FIGS. 3-5.

Process 600 may include additional aspects, such as any single aspect or any combination of aspects described below and/or in connection with one or more other processes described elsewhere herein.

In a first aspect, the indication includes one or more bits in an ML group switching field of a DCI.

In a second aspect, alone or in combination with the first aspect, process 600 includes receiving an RRC message that indicates a location of the ML group switching field in the DCI.

In a third aspect, alone or in combination with one or more of the first and second aspects, the one or more bits indicate the second ML group.

In a fourth aspect, alone or in combination with one or more of the first through third aspects, the RRC message indicates a timer specifying a period of time for which the UE is to remain in the second ML group, and process 600 includes switching back to the first ML group upon expiration of the timer or at a last slot of a remaining channel occupancy duration indicated by the ML group switching field.

In a fifth aspect, alone or in combination with one or more of the first through fourth aspects, the timer is not associated with a particular ML group.

In a sixth aspect, alone or in combination with one or more of the first through fifth aspects, the timer is associated with the first ML group or the second ML group.

In a seventh aspect, alone or in combination with one or more of the first through sixth aspects, the first ML group is an anchor group, and the second ML group is a non-anchor group.

In an eighth aspect, alone or in combination with one or more of the first through seventh aspects, the RRC message indicates a timer specifying a period of time for which the UE is to remain in the second ML group, and process 600 includes receiving an indication of a third ML group and switching to the third ML group upon expiration of the timer.

In a ninth aspect, alone or in combination with one or more of the first through eighth aspects, the one or more bits include a bit that indicates that the UE is to return to the second ML group, where the second ML group was used prior to the first ML group. This may include immediately prior (previous ML group).

In a tenth aspect, alone or in combination with one or more of the first through ninth aspects, the one or more bits include a bit that indicates that the UE is to continue with the first ML group (and not switch).

In an eleventh aspect, alone or in combination with one or more of the first through tenth aspects, process 600 includes receiving an indication of the second ML group or a third ML group in DCI, a MAC CE, or an RRC message.

In a twelfth aspect, alone or in combination with one or more of the first through eleventh aspects, the second ML group has a different complexity or functionality than a complexity or functionality of the first ML group.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
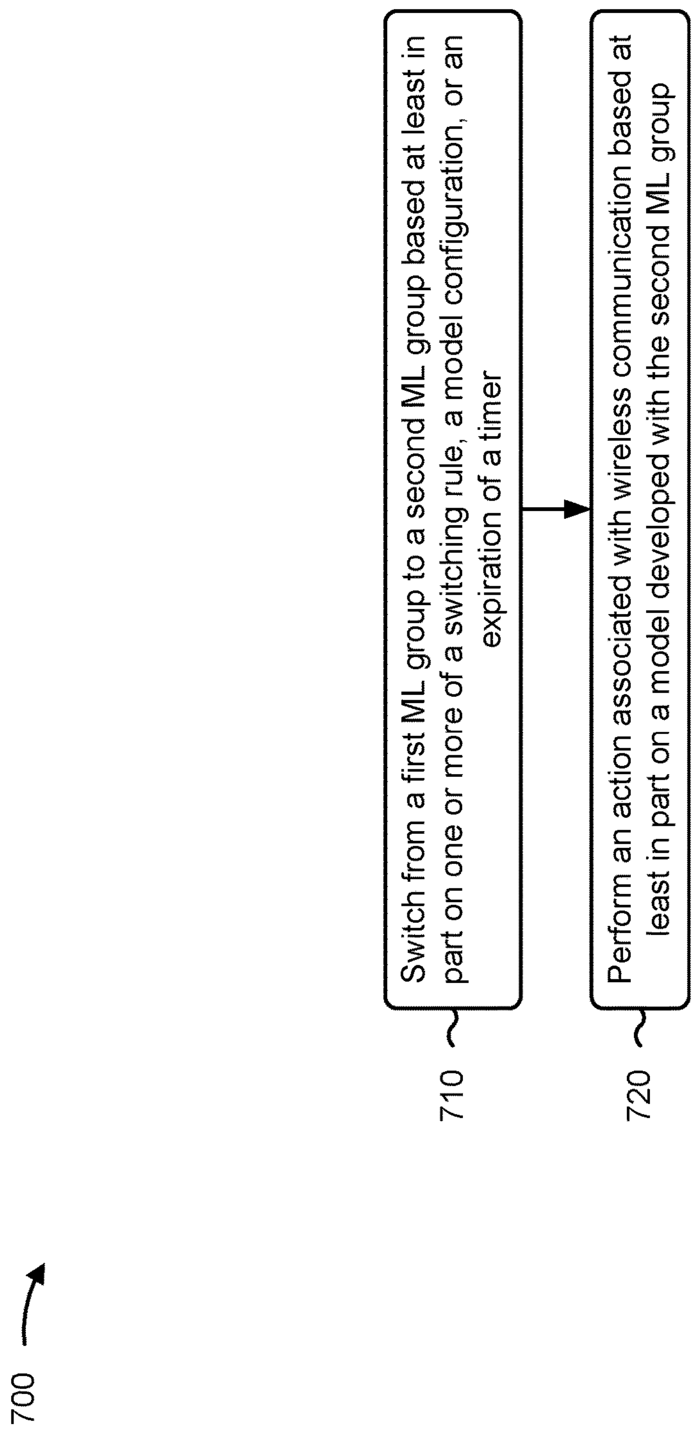
FIG. 7 is a diagram illustrating an example process performed, for example, by a first UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with ML group switching.

As shown in FIG. 7, in some aspects, process 700 may include switching from a first ML group to a second ML group based at least in part on one or more of a switching rule, a model configuration, or an expiration of a timer (block 710). For example, the UE (e.g., using communication manager 140 and/or switching component 908 depicted in FIG. 9) may switch from a first ML group to a second ML group based at least in part on one or more of a switching rule, an ML group configuration, a model configuration, or an expiration of a timer, as described above in connection with FIGS. 3-5.

As further shown in FIG. 7, in some aspects, process 700 may include performing an action associated with wireless communication based at least in part on a model developed with the second ML group (block 720). For example, the UE (e.g., using communication manager 140 and/or performing component 910 depicted in FIG. 9) may perform an action associated with wireless communication based at least in part on a model developed with the second ML group, as described above in connection with FIGS. 3-5.

Process 700 may include additional aspects, such as any single aspect or any combination of aspects described below and/or in connection with one or more other processes described elsewhere herein.

In a first aspect, the timer is not associated with a particular ML group.

In a second aspect, alone or in combination with the first aspect, the timer is associated with the first ML group or the second ML group.

In a third aspect, alone or in combination with one or more of the first and second aspects, the first ML group is an anchor group and the second ML group is a non-anchor group, and the switching rule specifies that, upon entering a new serving cell, the UE is to switch to the first ML group or continue with the first ML group.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
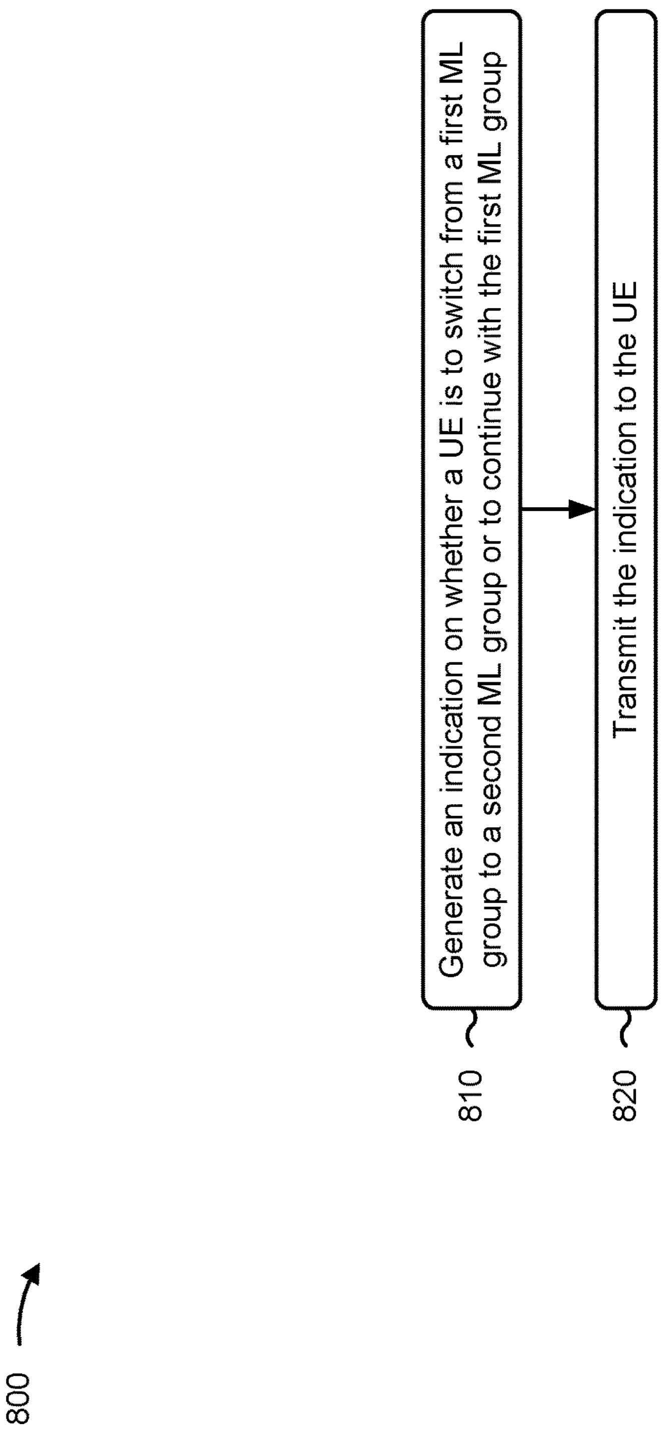
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with ML group switching.

As shown in FIG. 8, in some aspects, process 800 may include generating an indication on whether a UE is to switch from a first ML group to a second ML group or to continue with the first ML group (block 810). For example, the base station (e.g., using communication manager 150 and/or generation component 1008 depicted in FIG. 10) may generate an indication on whether a UE is to switch from a first ML group to a second ML group or to continue with the first ML group, as described above in connection with FIGS. 3-5.

As further shown in FIG. 8, in some aspects, process 800 may include transmitting the indication to the UE (block 820). For example, the base station (e.g., using communication manager 150 and/or transmission component 1004 depicted in FIG. 10) may transmit the indication to the UE, as described above in connection with FIGS. 3-5.

Process 800 may include additional aspects, such as any single aspect or any combination of aspects described below and/or in connection with one or more other processes described elsewhere herein.

In a first aspect, the indication includes one or more bits in an ML group switching field of a DCI.

In a second aspect, alone or in combination with the first aspect, process 800 includes transmitting an RRC message that indicates a location of the ML group switching field in the DCI.

In a third aspect, alone or in combination with one or more of the first and second aspects, the one or more bits indicate the second ML group.

In a fourth aspect, alone or in combination with one or more of the first through third aspects, the RRC message indicates a timer specifying a period of time for which the UE is to remain in the second ML group.

In a fifth aspect, alone or in combination with one or more of the first through fourth aspects, the one or more bits include a bit that indicates that the UE is to return to the second ML group, where the second ML group was used prior to the first ML group.

In a sixth aspect, alone or in combination with one or more of the first through fifth aspects, the one or more bits include a bit that indicates that the UE is to continue with the first ML group.

In a seventh aspect, alone or in combination with one or more of the first through sixth aspects, process 800 includes transmitting an indication of the second ML group or a third ML group via a DCI, a MAC CE, or an RRC message.

In an eighth aspect, alone or in combination with one or more of the first through seventh aspects, the first ML group is an anchor group, and the second ML group is a non-anchor group.

In a ninth aspect, alone or in combination with one or more of the first through eighth aspects, the second ML group has a different complexity or functionality than a complexity or functionality of the first ML, group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
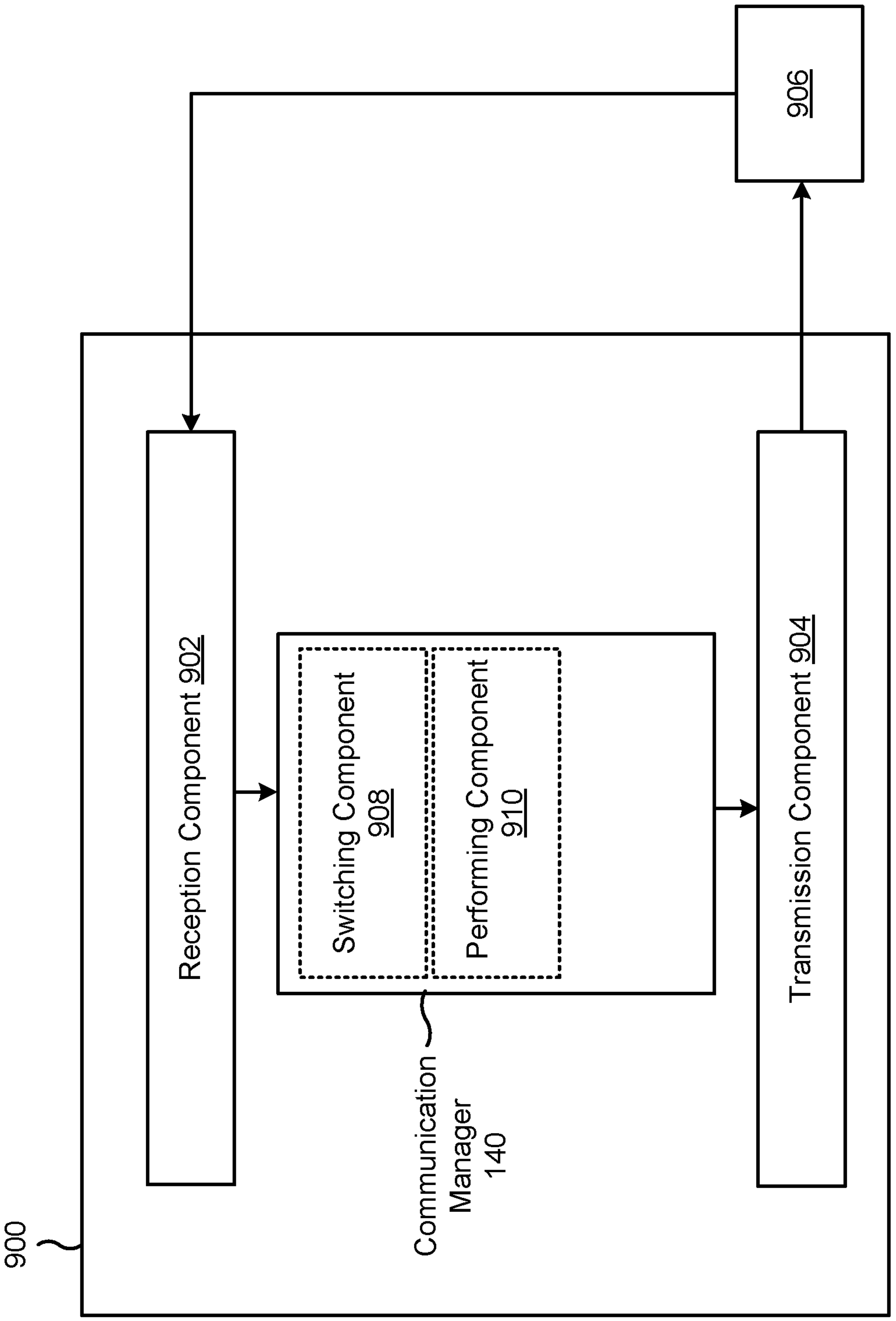
FIGS. 9-10 are diagrams of example apparatuses for wireless communication, in accordance with the present disclosure.

FIG. 9 is a diagram of an example apparatus 900 for wireless communication. The apparatus 900 may be a UE (e.g., UE 120), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a switching component 908 and/or a performing component 910, among other examples.

In some aspects, the apparatus 900 may be configured to perform one or more operations described herein in connection with FIGS. 1-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication on whether to switch from a first ML group to a second ML group or to continue with the first ML group. The switching component 908 may switch to the second ML group if the indication is to switch or continuing with the first ML group if the indication is to continue. The performing component 910 may perform a first action associated with wireless communication based at least in part on a first model developed with the first ML group if the indication is to continue or a second action associated with wireless communication based at least in part on a second model developed with the second ML group if the indication is to switch.

The reception component 902 may receive an RRC message that indicates a location of the ML group switching field in the DCI. The reception component 902 may receive an indication of the second ML group or a third ML group in DCI, a MAC CE, or an RRC message In some aspects, the switching component 908 may switch from a first ML group to a second ML group based at least in part on one or more of a switching rule, a model configuration, or an expiration of a timer. The performing component 910 may perform an action associated with wireless communication based at least in part on a model developed with the second ML group.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
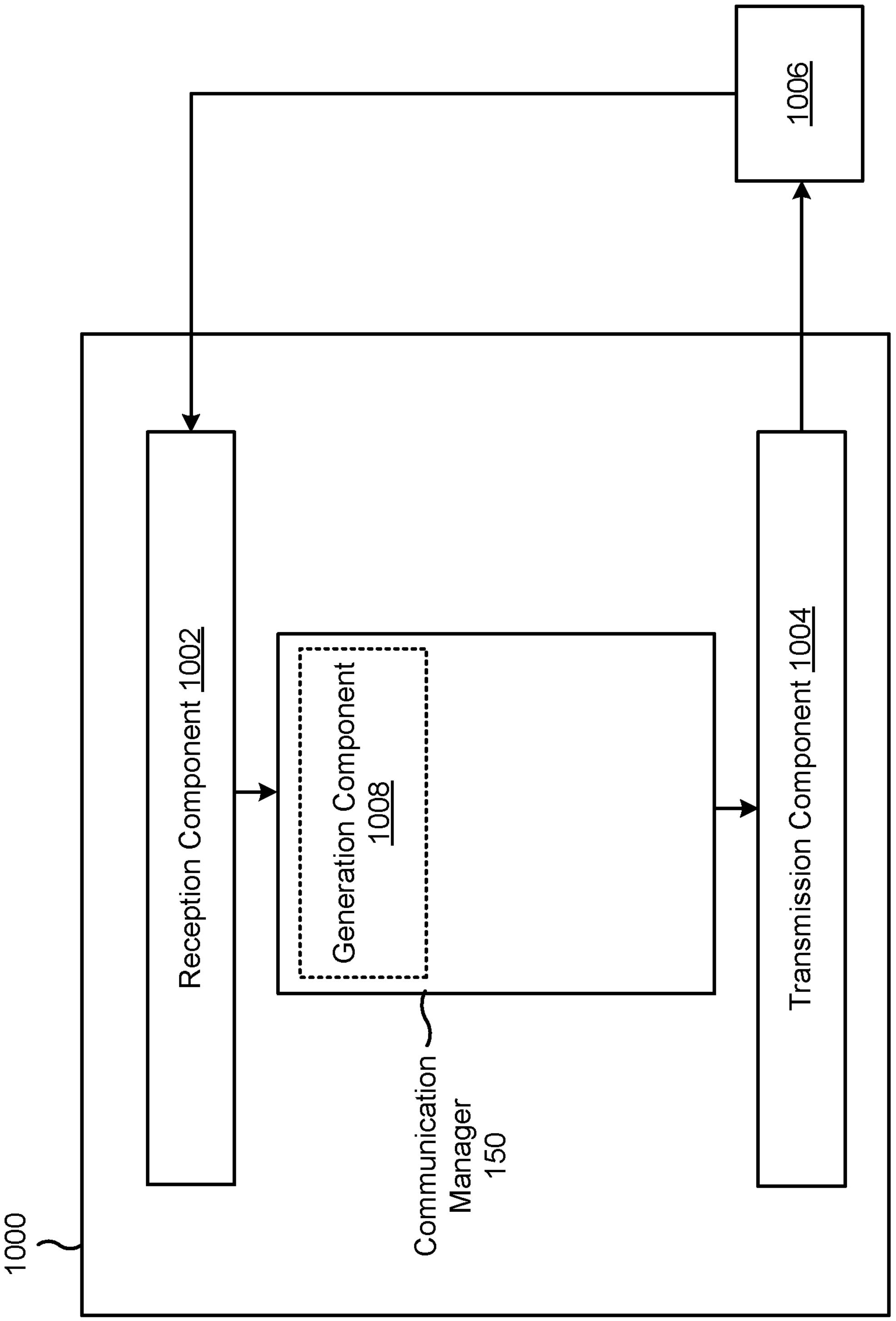

FIG. 10 is a diagram of an example apparatus 1000 for wireless communication. The apparatus 1000 may be a base station (e.g., base station 110), or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a generation component 1008, among other examples.

In some aspects, the apparatus 1000 may be configured to perform one or more operations described herein in connection with FIGS. 1-5. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The generation component 1008 may generate an indication on whether a UE is to switch from a first ML group to a second ML group or to continue with the first ML group. The transmission component 1004 may transmit the indication to the UE.

The transmission component 1004 may transmit an RRC message that indicates a location of the ML group switching field in the DCI.

The transmission component 1004 may transmit an indication of the second ML group or a third ML group via a DCI, a MAC CE, or an RRC message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The Following Provides an Overview of Some Aspects of the Present Disclosure:

Aspect 1: A method of wireless communication performed by a first user equipment (UE), comprising: receiving an indication on whether to switch from a first machine learning (ML) group to a second ML group or to continue with the first ML group; switching to the second ML group if the indication is to switch or continuing with the first ML group if the indication is to continue; and performing a first action associated with wireless communication based at least in part on a first model developed with the first ML group if the indication is to continue or a second action associated with wireless communication based at least in part on a second model developed with the second ML group if the indication is to switch.

Aspect 2: The method of Aspect 1, wherein the indication includes one or more bits in an ML group switching field of a downlink control information (DCI).

Aspect 3: The method of Aspect 2, further comprising receiving a radio resource control (RRC) message that indicates a location of the ML group switching field in the DCI.

Aspect 4: The method of Aspect 2 or 3, wherein the one or more bits indicate the second ML group.

Aspect 5: The method of Aspect 4, wherein the RRC message indicates a timer specifying a period of time for which the UE is to remain in the second ML group, and wherein the method further comprises switching back to the first ML group upon expiration of the timer or at a last slot of a remaining channel occupancy duration indicated by the ML group switching field.

Aspect 6: The method of Aspect 5, wherein the timer is not associated with a particular ML group.

Aspect 7: The method of Aspect 5, wherein the timer is associated with the first ML group or the second ML group.

Aspect 8: The method of any of Aspects 5-7, wherein the first ML group is an anchor group, and the second ML group is a non-anchor group.

Aspect 9: The method of Aspect 4, wherein the RRC message indicates a timer specifying a period of time for which the UE is to remain in the second ML group, wherein the method further comprises: receiving an indication of a third ML group; and switching to the third ML group upon expiration of the timer.

Aspect 10: The method of Aspect 2, wherein the one or more bits include a bit that indicates that the ULE is to return to the second ML group, wherein the second ML group was used prior to the first ML group.

Aspect 11: The method of Aspect 2, wherein the one or more bits include a bit that indicates that the UE is to continue with the first ML group.

Aspect 12: The method of any of Aspects 1-11, further comprising receiving an indication of the second ML group or a third ML group in downlink control information, a medium access control control element (MAC CE), or in a radio resource control message.

Aspect 13: The method of any of Aspects 1-12, wherein the second ML group has a different complexity or functionality than a complexity or functionality of the first ML group.

Aspect 14: A method of wireless communication performed by a first user equipment (UE), comprising: switching from a first machine learning (ML) group to a second ML group based at least in part on one or more of a switching rule, an ML group configuration, a model configuration, or an expiration of a timer; and performing an action associated with wireless communication based at least in part on a model developed with the second ML group.

Aspect 15: The method of Aspect 14, wherein the timer is not associated with a particular ML group.

Aspect 16: The method of Aspect 14, wherein the timer is associated with the first ML group or the second ML group.

Aspect 17: The method of any of Aspects 14-16, wherein the first ML group is an anchor group and the second ML group is a non-anchor group, and wherein the switching rule specifies that, upon entering a new serving cell, the UE is to switch to the first ML group or continue with the first ML group.

Aspect 18: A method of wireless communication performed by a base station, comprising: generating an indication on whether a user equipment (UE) is to switch from a first machine learning (ML) group to a second ML group or to continue with the first ML group; and transmitting the indication to the UE.

Aspect 19: The method of Aspect 18, wherein the indication includes one or more bits in an ML group switching field of a downlink control information (DCI).

Aspect 20: The method of Aspect 19, further comprising transmitting a radio resource control (RRC) message that indicates a location of the ML group switching field in the DCI.

Aspect 21: The method of Aspect 19 or 20, wherein the one or more bits indicate the second ML group.

Aspect 22: The method of Aspect 20, wherein the RRC message indicates a timer specifying a period of time for which the UE is to remain in the second ML group.

Aspect 23: The method of any of Aspects 19-22, wherein the one or more bits include a bit that indicates that the UE is to return to the second ML group, wherein the second ML group was used prior to the first ML group.

Aspect 24: The method of any of Aspects 19-22, wherein the one or more bits include a bit that indicates that the UE is to continue with the first ML group.

Aspect 25: The method of any of Aspects 18-24, further comprising transmitting an indication of the second ML group or a third ML group via a downlink control information, a medium access control control element (MAC CE), or a radio resource control message.

Aspect 26: The method of Aspects 18-25, wherein the first ML group is an anchor group, and the second ML group is a non-anchor group.

Aspect 27: The method of Aspects 18-26, wherein the second ML group has a different complexity or functionality than a complexity or functionality of the first ML group.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:

a memory; and one or more processors, coupled to the memory, configured to:

receive an indication on whether to switch from a first machine learning (ML) group to a second ML group or to continue with the first ML group, wherein each of the first ML group and the second ML group includes a respective plurality of ML models;

switch to the second ML group if the indication is to switch, wherein the indication to switch comprises an indication to stop a use of ML models associated with the first ML group and start a use of ML models associated with the second ML group; and perform a first action associated with wireless communication based at least in part on a first model developed with the first ML group if the indication is to continue or a second action associated with wireless communication based at least in part on a second model developed with the second ML group if the indication is to switch.

2. The UE of claim 1, wherein the indication includes one or more bits in an ML group switching field of a downlink control information (DCI).

3. The UE of claim 2, wherein the one or more bits indicate the second ML group.

4. The UE of claim 2, wherein the one or more processors are configured to receive a radio resource control (RRC) message that indicates a location of the ML group switching field in the DCI.

5. The UE of claim 4, wherein the RRC message indicates a timer specifying a period of time for which the UE is to remain in the second ML group, and wherein the one or more processors are configured to switch back to the first ML group upon expiration of the timer or at a last slot of a remaining channel occupancy duration indicated by the ML group switching field.

6. The UE of claim 5, wherein the timer is not associated with a particular ML group.

7. The UE of claim 5, wherein the timer is associated with the first ML group or the second ML group.

8. The UE of claim 5, wherein the first ML group is an anchor group, and the second ML group is a non-anchor group.

9. The UE of claim 4, wherein the RRC message indicates a timer specifying a period of time for which the UE is to remain in the second ML group, wherein the one or more processors are configured to:

receive an indication of a third ML group; and switch to the third ML group upon expiration of the timer.

10. The UE of claim 2, wherein the one or more bits include a bit that indicates that the UE is to return to the second ML group, wherein the second ML group was used prior to the first ML group.

11. The UE of claim 2, wherein the one or more bits include a bit that indicates that the UE is to continue with the first ML group.

12. The UE of claim 1, wherein the one or more processors are configured to receive an indication of the second ML group or a third ML group in downlink control information, a medium access control control element (MAC CE), or in a radio resource control message.

13. The UE of claim 1, wherein the second ML group has a different complexity or functionality than a complexity or functionality of the first ML group.

14. The UE of claim 1, wherein the first ML group corresponds to a first set of wireless communication functions and the second ML group corresponds to a second set of wireless communication functions.

15. A user equipment (UE) for wireless communication, comprising:

a memory; and one or more processors, coupled to the memory, configured to:

switch from a first machine learning (ML) group to a second ML group based at least in part on one or more of a switching rule, an ML group configuration, a model configuration, or an expiration of a timer, wherein each of the first ML group and the second ML group includes a respective plurality of ML models, and wherein to switch from the first ML group to the second ML group, the one or more processors are configured to stop a use of ML models associated with the first ML group and start a use of ML models associated with the second ML group; and perform an action associated with wireless communication based at least in part on a model developed with the second ML group.

16. The UE of claim 15, wherein the timer is not associated with a particular ML group.

17. The UE of claim 15, wherein the timer is associated with the first ML group or the second ML group.

18. The UE of claim 15, wherein the first ML group is an anchor group and the second ML group is a non-anchor group, and wherein the switching rule specifies that, upon entering a new serving cell, the UE is to switch to the first ML group or continue with the first ML group.

19. A base station for wireless communication, comprising:

a memory; and one or more processors, coupled to the memory, configured to:

generate an indication on whether a user equipment (UE) is to switch from a first machine learning (ML) group to a second ML group, wherein each of the first ML group and the second ML group includes a respective plurality of ML models, and wherein the indication to switch comprises an indication to stop a use of ML models associated with the first ML group and start a use of ML models associated with the second ML group; and transmit the indication to the UE.

20. The base station of claim 19, wherein the indication includes one or more bits in an ML group switching field of a downlink control information (DCI).

21. The base station of claim 20, wherein the one or more bits indicate the second ML group.

22. The base station of claim 20, wherein the one or more processors are configured to transmit a radio resource control (RRC) message that indicates a location of the ML group switching field in the DCI.

23. The base station of claim 22, wherein the RRC message indicates a timer specifying a period of time for which the UE is to remain in the second ML group.

24. The base station of claim 20, wherein the one or more bits include a bit that indicates that the UE is to return to the second ML group, wherein the second ML group was used prior to the first ML group.

25. The base station of claim 20, wherein the one or more bits include a bit that indicates that the UE is to continue with the first ML group.

26. The base station of claim 19, wherein the one or more processors are configured to transmit an indication of the second ML group or a third ML group via a downlink control information, a medium access control control element (MAC CE), or a radio resource control message.

27. The base station of claim 19, wherein the first ML group is an anchor group, and the second ML group is a non-anchor group.

28. The base station of claim 19, wherein the second ML group has a different complexity or functionality than a complexity or functionality of the first ML group.

29. A method of wireless communication performed by a first user equipment (UE), comprising:

receiving an indication on whether to switch from a first machine learning (ML) group to a second ML group or to continue with the first ML group, wherein each of the first ML group and the second ML group includes a respective plurality of ML models;

switching to the second ML group if the indication is to switch, wherein switching to the second ML group includes stopping use of ML models associated with the first ML group and starting use of ML models associated with the second ML group; and performing a first action associated with wireless communication based at least in part on a first model developed with the first ML group if the indication is to continue or a second action associated with wireless communication based at least in part on a second model developed with the second ML group if the indication is to switch.

30. The method of claim 29, wherein the indication includes one or more bits in an ML group switching field of a downlink control information (DCI).

* * * * *